(12) United States Patent
Li et al.

(10) Patent No.: US 11,139,649 B2
(45) Date of Patent: Oct. 5, 2021

(54) MOTOR CONTROL SYSTEM WITH INTEGRATED SOLID-STATE CONTACTOR AND RELAYS AND METHOD OF OPERATION THEREOF

(71) Applicant: Eaton Intelligent Power Limited, Dublin (IE)

(72) Inventors: Huaqiang Li, Menomonee Falls, WI (US); Joseph Paul Uphaus, Whitefish Bay, WI (US)

(73) Assignee: Eaton Intelligent Power Limited, Dublin (IE)

( * ) Notice: Subject to any disclaimer, the term of this patent is extended or adjusted under 35 U.S.C. 154(b) by 953 days.

(21) Appl. No.: 15/854,118

(22) Filed: Dec. 26, 2017

(65) Prior Publication Data

US 2019/0199085 A1   Jun. 27, 2019

(51) Int. Cl.
*H02H 7/122*   (2006.01)
*H02P 27/06*   (2006.01)
(Continued)

(52) U.S. Cl.
CPC .......... *H02H 7/1225* (2013.01); *H02H 3/033* (2013.01); *H02H 3/06* (2013.01); *H02H 3/162* (2013.01); *H02M 1/32* (2013.01); *H02M 5/4585* (2013.01); *H02M 7/003* (2013.01); *H02M 7/53871* (2013.01); *H02P 1/28* (2013.01); *H02P 1/30* (2013.01); *H02P 3/18* (2013.01); *H02P 27/026* (2013.01); *H02P 27/06* (2013.01); *H02M 5/458* (2013.01)

(58) Field of Classification Search
CPC ............................. H02H 7/1225; H02M 1/32
See application file for complete search history.

(56) References Cited

U.S. PATENT DOCUMENTS 4,142,136 A * 2/1979 Witter ....................... H02P 1/28
318/779
4,356,525 A   10/1982 Komrumpf et al.
(Continued)

OTHER PUBLICATIONS

"PowerGate 'H' HVAC Bypass Controller," Mitsubishi Electric Corporation, Feb. 2, 2017, pp. 1-2, https://us.mitsubishielectric.com/fa/en/solutions/industries/hvac/powergatehseries.

*Primary Examiner* — Eduardo Colon Santana
*Assistant Examiner* — Devon A Joseph
(74) *Attorney, Agent, or Firm* — DiBerardino McGovern IP Group LLC (57) ABSTRACT

A motor control system includes a motor switching assembly comprising a power converter positioned on a converter path, a first relay positioned on the converter path upstream of the power converter, a second relay positioned on a bypass path that is in parallel with the converter path, and a solid-state switching unit positioned upstream from the converter path and the bypass path. The motor control system also includes a control system that controls operation of the motor switching assembly, with the control system programmed to operate the solid-state switching unit in one of a conducting mode, a non-conducting mode, and a ramping mode, so as to selectively control and condition power flow therethrough. The control system is also programmed to control switching of the first and second relays between open and closed positions to selectively route power along the converter path or the bypass path.

20 Claims, 6 Drawing Sheets

(51) Int. Cl.
| | |
|---|---|
| *H02M 7/00* | (2006.01) |
| *H02M 5/458* | (2006.01) |
| *H02P 27/02* | (2016.01) |
| *H02M 7/5387* | (2007.01) |
| *H02M 1/32* | (2007.01) |
| *H02P 3/18* | (2006.01) |
| *H02H 3/16* | (2006.01) |
| *H02P 1/30* | (2006.01) |
| *H02H 3/033* | (2006.01) |
| *H02P 1/28* | (2006.01) |
| *H02H 3/06* | (2006.01) |

(56) References Cited

U.S. PATENT DOCUMENTS

| | | | |
|---|---|---|---|
| 5,714,851 A * | 2/1998 | Antony | B60L 3/003 |
| | | | 318/148 |
| 5,824,990 A | 10/1998 | Geissler et al. | |
| 5,894,415 A | 4/1999 | Habegger | |
| 6,163,129 A | 12/2000 | Younger et al. | |
| 7,224,557 B2 | 5/2007 | Kinsella et al. | |
| 7,719,219 B2 | 5/2010 | Baumann et al. | |
| 7,940,018 B2 | 5/2011 | Yonemori et al. | |
| 8,014,110 B2 | 9/2011 | Schnetzka et al. | |
| 8,228,019 B2 | 7/2012 | Higuchi et al. | |
| 8,693,170 B2 | 4/2014 | Barreau et al. | |
| 9,018,882 B2 | 4/2015 | Mack et al. | |
| 9,641,095 B1 | 5/2017 | Wild et al. | |
| 9,800,188 B2 * | 10/2017 | Chretien | H02P 23/28 |
| 10,075,118 B2 * | 9/2018 | Chretien | H02P 1/426 |
| 10,439,540 B1 * | 10/2019 | Chretien | H02P 25/18 |
| 2004/0262997 A1 | 12/2004 | Gull et al. | |
| 2005/0035664 A1 | 2/2005 | Zver et al. | |
| 2005/0189889 A1 * | 9/2005 | Wirtz | H05K 7/1432 |
| | | | 318/105 |
| 2008/0094771 A1 | 4/2008 | Messersmith et al. | |
| 2008/0103632 A1 | 5/2008 | Saban et al. | |
| 2008/0136259 A1 * | 6/2008 | Coffey | H02B 1/04 |
| | | | 307/11 |
| 2010/0145589 A1 * | 6/2010 | Kobayashi | B60K 6/46 |
| | | | 701/93 |
| 2012/0098261 A1 * | 4/2012 | Rozman | F02N 11/006 |
| | | | 290/31 |
| 2012/0187886 A1 * | 7/2012 | Mack | H02P 27/06 |
| | | | 318/503 |
| 2013/0020975 A1 | 1/2013 | Wolfe et al. | |
| 2013/0076126 A1 * | 3/2013 | Hashimoto | B60L 50/61 |
| | | | 307/9.1 |
| 2013/0099567 A1 | 4/2013 | Pfitzer | |
| 2013/0235494 A1 | 9/2013 | Holce et al. | |
| 2014/0307367 A1 * | 10/2014 | Maeda | H05K 7/1471 |
| | | | 361/640 |
| 2015/0035286 A1 | 2/2015 | Stephens | |
| 2015/0162864 A1 | 6/2015 | Moghadas et al. | |
| 2015/0171733 A1 | 6/2015 | Zargari et al. | |
| 2015/0283911 A1 | 10/2015 | Ambrosio | |
| 2016/0043670 A1 | 2/2016 | Nakamura et al. | |
| 2016/0242313 A1 * | 8/2016 | Singh | H05K 3/0061 |
| 2016/0268797 A1 | 9/2016 | Li et al. | |
| 2016/0373017 A1 * | 12/2016 | Mima | H02J 9/06 |
| 2017/0110991 A1 | 4/2017 | Frampton et al. | |
| 2018/0034403 A1 | 2/2018 | Kim et al. | |
| 2018/0167002 A1 | 6/2018 | Frampton et al. | |
| 2018/0178830 A1 | 6/2018 | Koseki et al. | |

\* cited by examiner

MOTOR CONTROL SYSTEM WITH INTEGRATED SOLID-STATE CONTACTOR AND RELAYS AND METHOD OF OPERATION THEREOF

BACKGROUND OF THE INVENTION

Embodiments of the invention relate generally to motor control systems and, more particularly, to motor control systems having a multi-functional solid state contactor that is integrated with downstream relays to selectively provide for operation of the system in power conversion and bypass modes of operation.

One type of system commonly used in industry that performs power conversion is an adjustable speed drive, also known as a variable frequency drive (VFD). A VFD is an industrial control device that provides for variable frequency, variable voltage operation of a driven system, such as an AC induction motor. In use, a VFD is often provided as part of a motor control system and an overall control and protection assembly that includes the VFD as well as an arrangement of input/output fuses, disconnects, circuit breakers or other protection devices, controllers, filters, sensors, and a bypass assembly that includes one or more of a bypass contactor and soft starter that provide alternate control paths or mechanisms for controlling the driven system.

As a general rule, the VFD and associated protection and control devices of the motor control system are provided as discrete components having their own housings, with the arrangement of components being housed within an enclosure. The arrangement of components are fixed to a support within the enclosure, such as a DIN rail for example, with wiring being provided between the components to provide for electrical connectivity and/or communication therebetween. Thus, when assembled as a unit, the overall collection of components and the enclosure required to house them become(s) quite large and bulky, and the amount of wiring required between the components becomes excessive and can hinder accessibility to the components.

Figure 1:
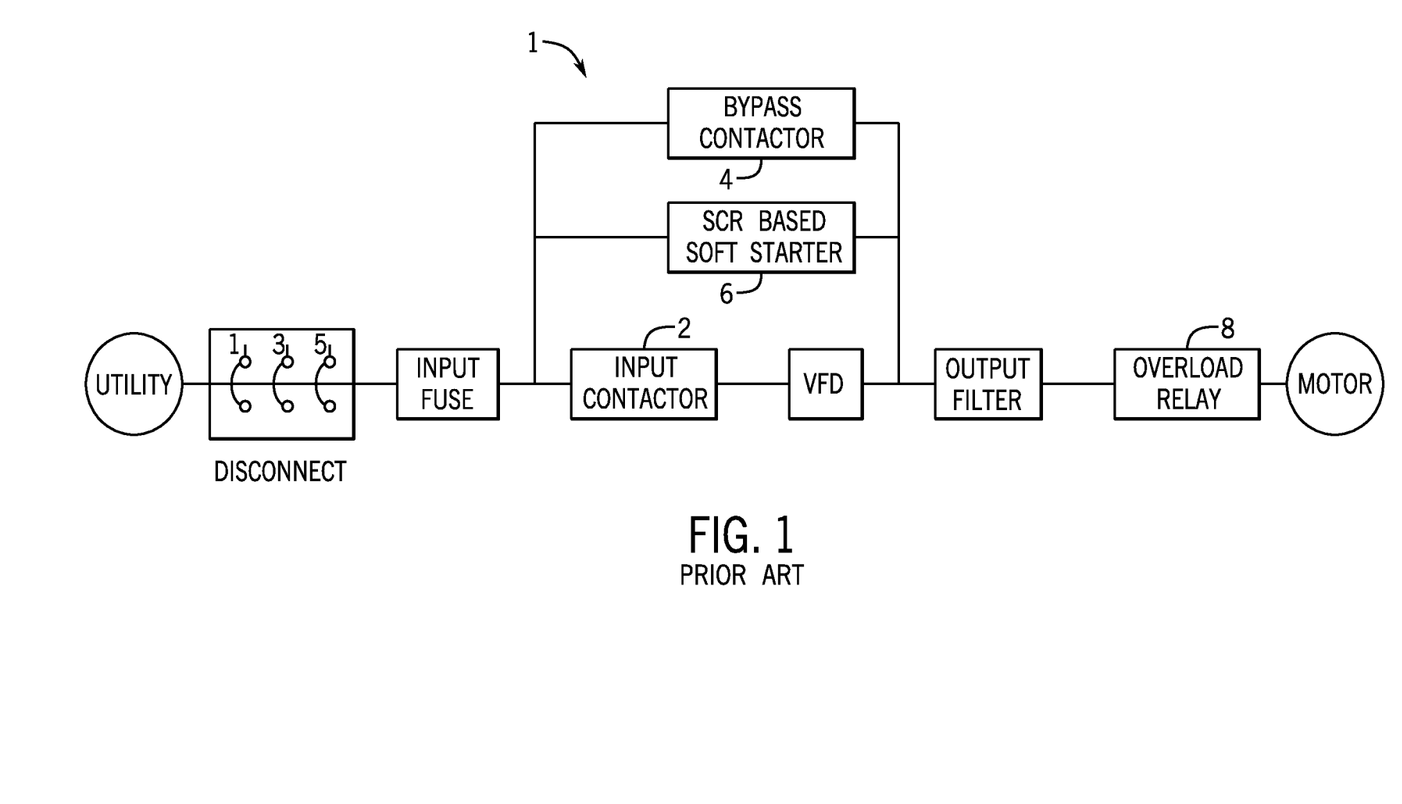
FIG. 1 is a block diagram of a motor control system having a bypass assembly included therein, as known in the prior art.

With particular regard to the bypass assembly that is included in the motor control system, it is known to use a traditional bypass assembly as a solution to provide system redundancy in case of VFD failure, or other scenarios such as VFD needing maintenance, the motor running full speed directly from utility for higher system efficiency, etc. It is desirable to thus provide the bypass assembly—especially if/when the VFD is installed in a critical environment and/or application. As indicated above, and as shown in the prior art FIG. 1, an existing bypass assembly 1 is typically added to a VFD installation as one or more additional discrete components—with a separate input contactor 2, bypass contactor 4, SCR-based soft-starter 6, and output/overload relay 8 typically being provided. However, the resulting combined installation—including the separate input contactor 2, bypass contactor 4, soft-starter 6, and output/overload relay 8—is expensive, complicated, bulky, and frequently impractical in many applications and/or installation sites.

It would therefore be desirable to provide a motor control system whose footprint is minimized and that requires less or no wiring between components thereof. It would further be desirable for such a motor control system to provide bypass capabilities using only the minimal number of discrete components that are necessary, so as to reduce size, cost, and complexity of the motor control system and provide increased functionalities and flexibility.

BRIEF DESCRIPTION OF THE INVENTION

In accordance with one aspect of the invention, a motor control system for selectively controlling power from a power source to a load is provided. The motor control system includes a motor switching assembly comprising a power converter positioned on a converter path and configured to receive power from the power source and provide a controlled output power to the load, a first relay positioned on the converter path upstream of the power converter, a second relay positioned on a bypass path that is in parallel with the converter path, and a solid-state switching unit positioned upstream from the converter path and the bypass path, the solid-state switching unit comprising a plurality of solid-state switches. The motor control system also includes a control system that controls operation of the motor switching assembly. The control system is programmed to control switching of the plurality of solid-state switches to operate the solid-state switching unit in one of a conducting mode, a non-conducting mode, and a ramping mode, so as to selectively control and condition power flow therethrough. The control system is also programmed to control switching of the first and second relays between open and closed positions to selectively route power along the converter path or the bypass path.

In accordance with another aspect of the invention, a controller-implemented method of operating a motor switching assembly for controlling power delivery from a power source to a load is provided. The method includes controlling the motor switching assembly to operate in one of a power conditioning mode or a bypass mode. In controlling the motor switching assembly to operate in the power conditioning mode, the method further includes operating a solid-state switching unit of the motor switching assembly in a conducting mode, operating an input relay of the motor switching assembly in a closed position, and operating a bypass relay of the motor switching assembly in an open position such that power from the power source is routed through the power converter, wherein the solid-state switching unit is positioned upstream from the power converter and upstream from a node to which the input relay and the bypass relay are parallelly connected. In controlling the motor switching assembly to operate in the bypass mode, the method further includes operating the solid-state switching unit in a conducting mode, operating the input relay in an open position, and operating the bypass relay in a closed position such that power from the power source bypasses the power converter.

In accordance with yet another aspect of the invention, a board-level motor switching assembly for controlling power from a power source to a load is provided. The board-level motor switching assembly includes a printed circuit board (PCB) structure and a plurality of protection and control components integrated onto the PCB structure. The plurality of protection and control components includes a multi-functional solid-state contactor comprising a plurality of solid-state switches that are selectively switchable to control and condition power flow through the multi-functional solid-state contactor, a VFD unit downstream from the multi-functional solid-state contactor and operable to provide a controlled output power to the load, an input relay positioned between the multi-functional solid-state contactor and the VFD unit and being switchable to control power flow into the VFD unit, and a bypass relay positioned between the multi-functional solid-state contactor and the VFD unit and connected in parallel with the input relay, the bypass relay being switchable to control power flow onto a bypass path that routes power flow around the VFD unit.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to motor control systems having an integrated solid-state contactor and relays and a method of operation thereof. The solid-state contactor is integrated into the motor control system to provide protection thereto and enable transitioning between operational modes, with the solid-state contactor providing multi-functionality for inputting power to a power converter and providing a bypass around the power converter. The integrated solid-state contactor replaces a number of discrete protection and control components typically found in motor control systems and provides more advanced controls in the motor control system, including power flow control and protection.

While embodiments of the invention are described and illustrated herebelow as being directed to a motor control system with a solid-state contactor and relays integrated therein, it is recognized that embodiments of the invention are not meant to be limited to such circuits. That is, embodiments of the invention may be extended more generally to power/energy conversion circuits of varying constructions and implementations, including motor starters, motor control centers, and power/energy conversion circuits for driving non-motor loads, for example. Accordingly, the following discussion of the integration of a solid-state contactor and relays into a motor control system is not meant to limit the scope of the invention.

Figure 2:
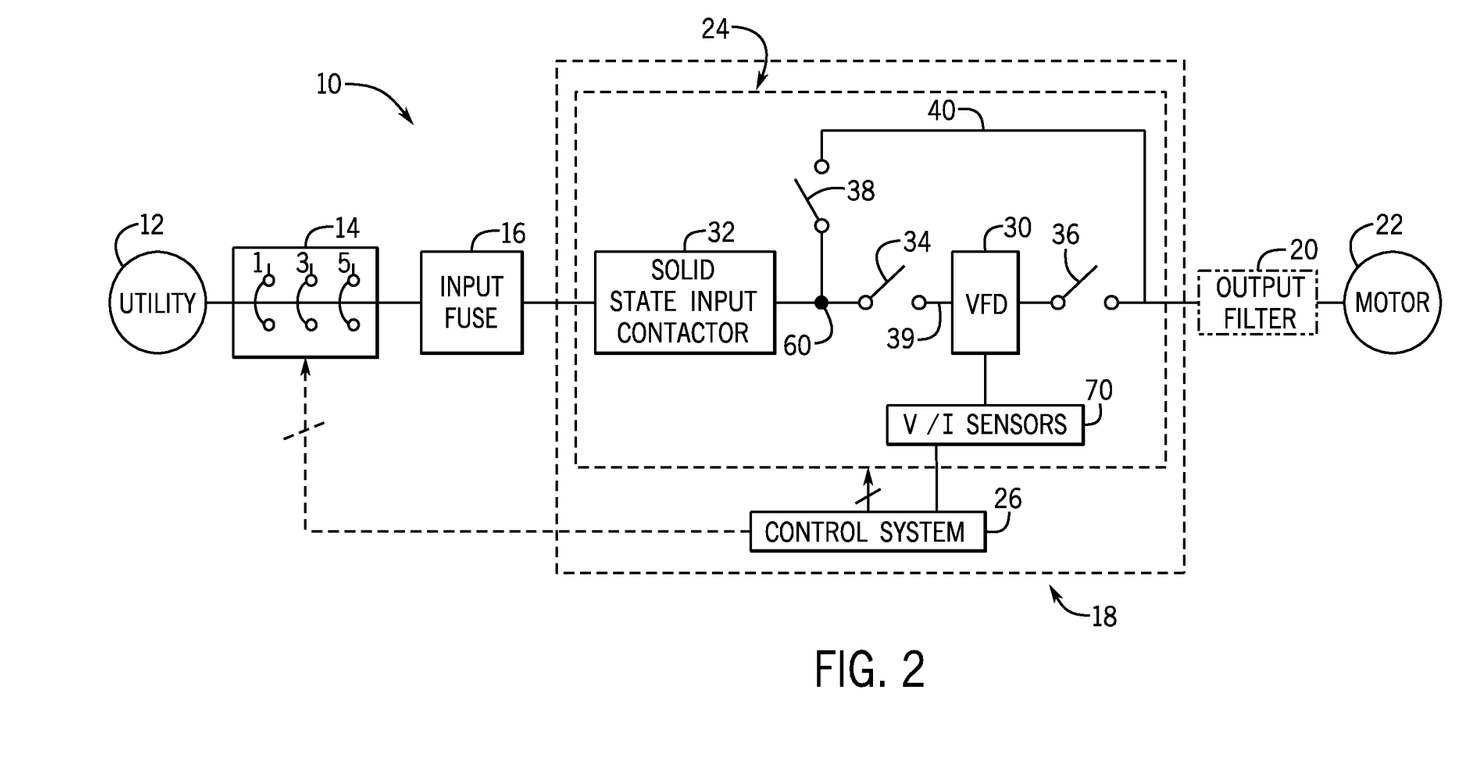
FIG. 2 is a block diagram of a motor control system having a board-level motor switching assembly with an integrated solid-state contactor and relays, according to an embodiment of the invention.
Figure 3A:
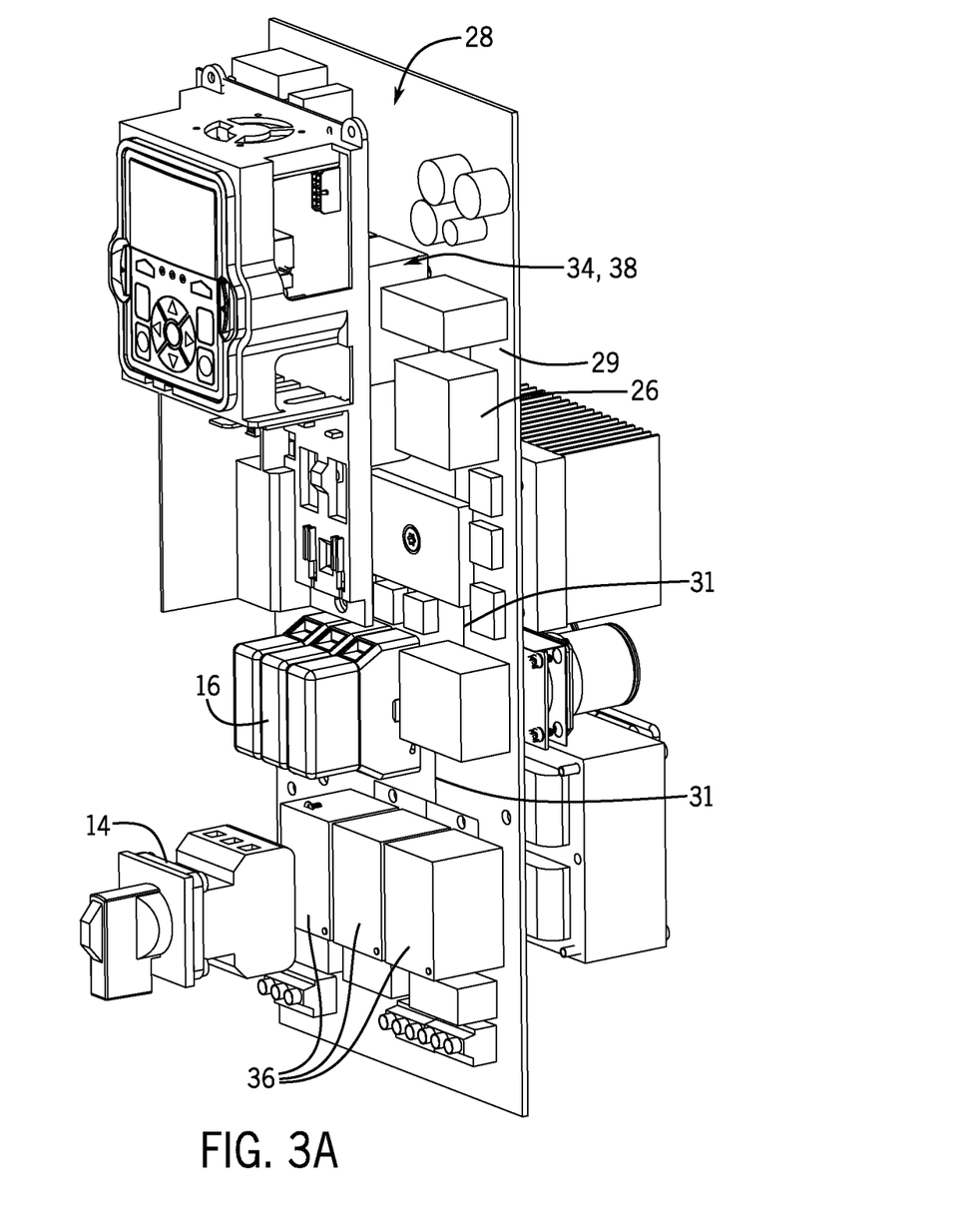
FIGS. 3A and 3B are perspective views of the board-level motor switching assembly of FIG. 2, according to an embodiment of the invention.
Figure 3B:
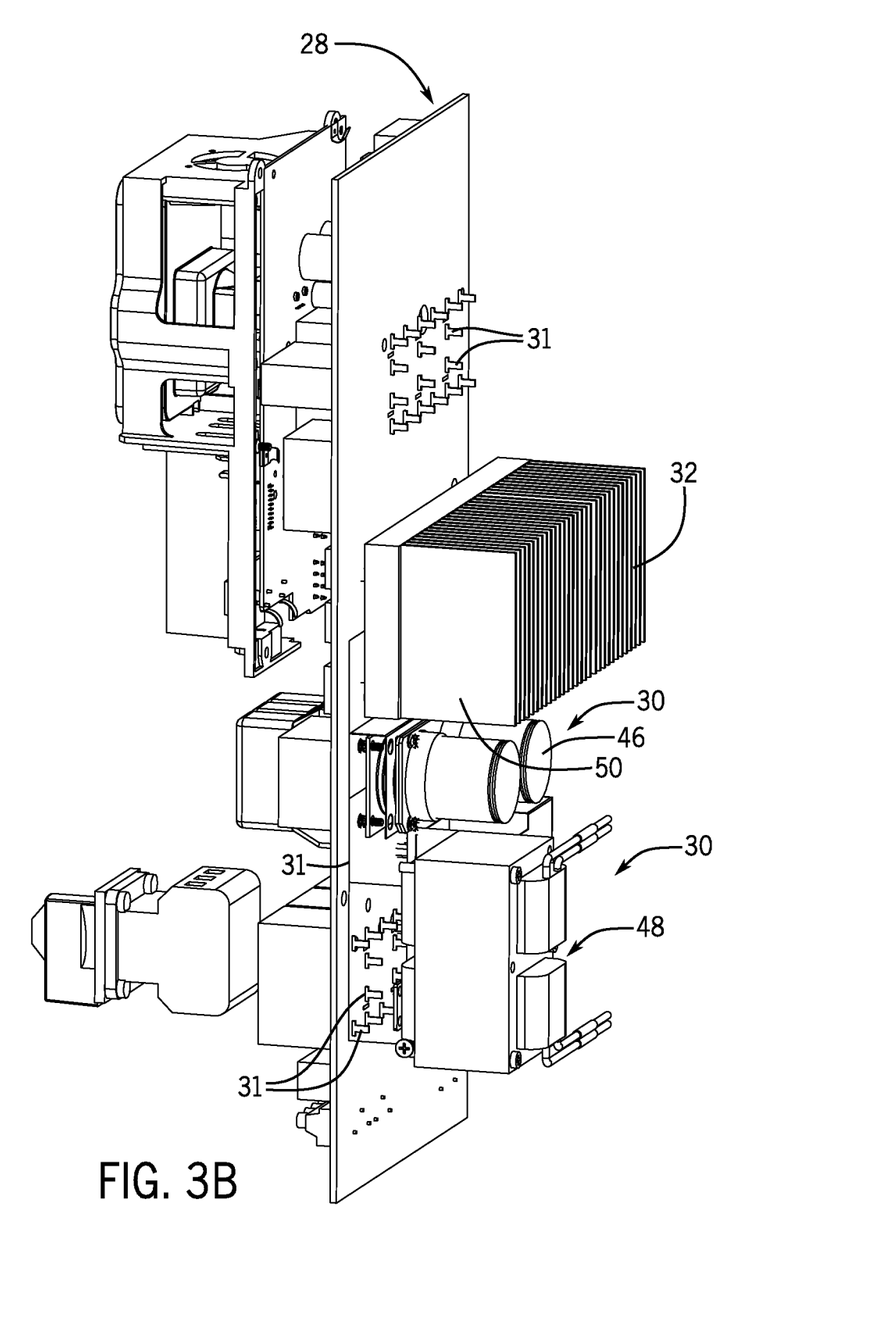

Referring to FIG. 2 and FIGS. 3A and 3B, block schematic and perspective views of a power system 10 are shown. Power system 10 includes a power source 12, such as from a utility, for example, coupled to a disconnect contactor or switch 14 that may be operated in a closed or On position in which power from utility 12 is allowed to flow therethrough and an open or Off position in which power may not flow therethrough. Power system 10 also includes an input fuse 16 coupled to disconnect switch 14. Input fuse 16 provides overcurrent protection by interrupting the current from utility 12 if the level of current becomes too high. Input fuse 16 is coupled to a motor control system 18, which is then coupled to an optional output filter 20 that helps protect a motor 22 (or other load) from the harmful effects of reflected waves due to impedance mismatch and prevent motor failure due to insulation failure, overheating, and noise.

Motor control system 18 of power system 10 includes a motor switching assembly or module 24 and a control system or controller 26 that provides control signals to various components of motor switching assembly 24 (and may optionally control the position of disconnect switch 14). According to an exemplary embodiment, the motor switching assembly 24 is provided as a board-level circuit, with the assembly including a plurality of protection and control components/devices that are mounted to or formed directly on a printed circuit board (PCB) structure 28. In the illustrated embodiment input fuse 16 and optional output filter 20 are also coupled to PCB 28 to provide a compact system that may be housed within a compact plastic enclosure (not shown). The PCB 28 may be of a standard or customized construction and includes an insulating substrate 29 with a plurality of traces or leads 31 formed thereon that provide electrical connection paths on the substrate 29 between components. The plurality of components included in motor switching assembly 24 that are mounted to or formed on the PCB 28 provide for control and protection of motor 22 and may include, without limitation, a power converter 30, a multi-functional solid-state input/bypass switching unit 32 (hereinafter "solid-state contactor"), and input, output, and bypass relays 34, 36, 38. According to an exemplary embodiment, power converter 30 is in the form of a VFD unit—and thus the power converter 30 is referred to hereafter as VFD unit 30. The operation of VFD unit 30 (along with other components of motor control system 18 enables driving and adjusting the operating speed of motor 22, which can be used to drive fans, conveyors, pumps, or other electromechanical devices.

As shown in FIGS. 3A and 3B, the components 30-38 of the motor switching assembly 24 are mounted directly to the PCB 28. Mounting of the board-level components 30-38 on the PCB 28 may be achieved via any of a number of appropriate means, including plug-and-play type components that snap onto the PCB 28 and/or components that are permanently soldered to the PCB 28. The components 30-38 may be electrically connected to the PCB 28 via contact pads on the PCB 28 that mate with or are soldered to corresponding pads on the respective components, and electrical connections and communications between the components 30-38 (and controller 26) may be provided via the traces 31 formed on the PCB 28 substrate. This mounting of components 30-38 directly to PCB 28 and use of electrical traces 31 to form connections between components results in a board-level motor switching assembly 24 having fewer terminal connections and cables, such that voltage losses in the motor switching assembly 24 are reduced and efficiency of the assembly is improved. In alternative embodiments, the motor switching assembly 24 may be provided with multiple PCB substrates, each having a select subset of components 30-38 mounted thereto.

With regard to solid-state contactor 32 and relays 34, 36, 38, these components may be selectively controlled to operate the motor switching assembly 24 in what are termed herein as a VFD mode (i.e., power conversion mode) or a bypass mode of operation (and a transitional mode when switching between the two modes of operation). Power is provided to motor 22 through VFD unit 30 in the VFD mode of operation along a converter path or trace 39, and power is provided to motor 22 through a bypass path or trace 40 (with VFD unit 30 disconnected) in the bypass mode of operation. In the case of an inverter fault, over temperature fault, or other error in the VFD unit 30, motor operation can be automatically transferred to the bypass path 40 to continue operation of the motor 22, maintain drive life, and realize other benefits. According to an exemplary embodiment of the invention, the solid-state contactor 32 and relays 34, 36, 38 replace a known bypass assembly configuration that typically includes separate/discrete input contactor, output contactor, bypass contactor, and SCR-based soft-starter components. As will be explained in greater detail below, the solid-state contactor 32 and relays 34, 36, 38 may be selectively operated to provide an input to the VFD unit 30 or bypass around the VFD unit 30 and to control current and voltage levels during switching between the VFD and bypass modes of operation.

Figure 4:
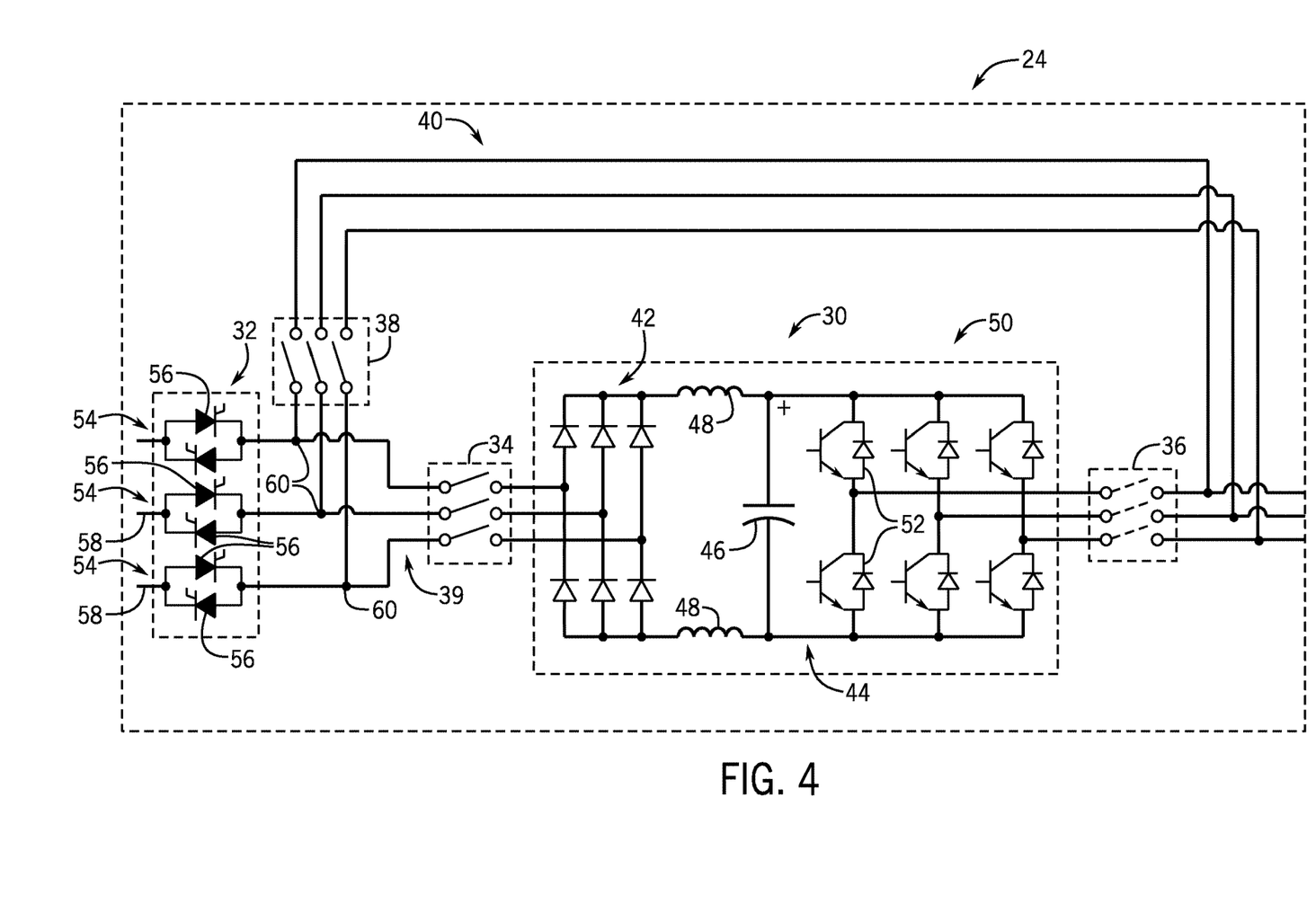
FIG. 4 is a schematic diagram of the motor switching assembly of FIG. 2 and FIGS. 3A and 3B, according to an embodiment of the invention.

Referring to FIG. 4, an exemplary structure/configuration of motor switching assembly 24 is shown—including the structure/configuration of VFD unit 30, solid-state contactor 32, and relays 34, 36, 38. With regard to VFD unit 30, it is recognized that the VFD unit 30 may be of known construction that may generally include: a rectifier bridge 42 that converts an AC input power into a DC power, a DC link 44 that receives the DC power from the rectifier bridge, a DC link capacitor bank 46 across DC link, and optional inductors 48 coupled in series with and on either side of the rectifier bridge 42 on DC link 44 (i.e., a DC choke). The VFD unit 30 may also include an inverter 50 to convert the DC power to AC power—with the inverter 50 being comprised of a plurality of solid-state switches 52 (e.g., IGBTs) that may be selectively controlled to output a desired three-phase, three line power from the VFD unit 30 and to the motor 22. The three-phase power output by VFD unit 30 is regulated/controlled by controller 26 via the transmission of gate drive signals to the inverter switches 52 to control opening and closing thereof, thereby controlling the current flow (and therefore the voltage) applied to the motor 22.

With regard to solid-state contactor 32, the unit includes a switching device 54 on each supply line of the three-phase input. In an exemplary embodiment each switching device is formed of a pair of anti-parallel switches 56, such as solid-state switches in the form of silicon controlled rectifiers (SCRs) or thyristors that control the current flow through switching device—hereinafter referred to as SCRs 56. As shown, the SCRs 56 on each phase are opposite in polarity and are connected in parallel for a respective line conductor 58. While each phase is shown as including a pair of SCRs 56, it is recognized that other suitable solid-state switches could instead be employed—including insulated gate bipolar transistors (IGBTs), bipolar junction transistors (BJTs), integrated gate-commutated thyristors (IGCTs), gate turn-off (GTO) thyristors, or metal-oxide semiconductor field-effect transistors (MOSFETs), as non-limiting examples. Since contactor 32 is formed of solid state devices 56 as opposed to a traditional electromechanical contactor, each solid state device 56 of contactor 32 can be controlled by controller 26 to regulate the amount of the line voltage and current present in motor switching assembly 24. In other words, controller 26 may control contactor 32 to selectively conduct and block the flow of current therethrough. This control over the line voltage and current enables controller 26 to be powered by the voltage and current from utility 12 as opposed to a standalone power supply that might have been necessary to provide a more stable source of power to controller 26. SCRs 56 further allow controller 26 to control solid state contactor 32 as an overload relay based on overvoltage and/or overcurrent conditions present in power system 10 (FIG. 2), as measured by various sensors (not shown). Additionally, the configuration of contactor 32 may allow controller 26 to control contactor 32 to act as a soft starter.

The board-level relays 34, 36, 38 of motor switching assembly 24 may be separately identified as input relay 34, output relay 36, and bypass relay 38.—Relays 34, 36, 38 may be selectively opened and closed to cause the motor switching assembly 24 to operate in either the VFD mode or the bypass mode of operation, so as to thereby control current flow through the motor switching assembly 24. According to embodiments of the invention, the relays 34, 36, 38 may be provided as electromechanical or solid state relays, such as, for example IGBTs or MOSFETs, which have a rating lower than a full motor voltage and lower than inrush current ratings. That is, as the solid-state contactor 32 upstream from relays 34, 36, 38 functions to selectively conduct and block the flow of current therethrough, the relays 34, 36, 38 may be switched under reduced voltage and current stress levels—i.e., switched at a zero load condition. Accordingly, the rating of the relays 34, 36, 38 may be less than the full motor voltage and inrush current ratings as compared to "traditional" motor and inrush rated relays/contactors found in a standard bypass assembly of a motor control device that are each required to have a full motor voltage and higher inrush current ratings (i.e., current rating of several times rated motor current).

In controlling operation of motor switching assembly 24, controller 26 controls of SCRs 56 in solid-state contactor 32 via the transmission of gate drive signals thereto. According to an exemplary embodiment, solid-state contactor 32 is operable in a number of distinct modes—including a "conducting" or "input" mode, a "non-conducting" or "transitional" mode, and a selectively controlled "start-up" or "ramping" mode, which will be explained in further detail below. The controller 26 in motor switching assembly 24 also controls switching of each of the relays 34, 36, 38 between an On/closed state or position and an Off/open state or position, such that current through the VFD unit 30 and output from the VFD unit 30 can be selectively controlled. More specifically, the input relay 34 and output relay 36 provide for current flow through VFD unit 30 when in an On/closed position and do not allow current flow through VFD unit 30 when in an Off/open position (instead electrically isolating the VFD unit 30 from solid-state contactor 32 and motor 22), while the bypass relay 38 provides for current flow through bypass path 40 when in an On/closed position and diverts current away from the bypass path 40 when in an Off/open position. Bypass relay 38 is controlled to be in the Off/open position when input and output relays 34, 36 are in the On/closed position (with this being the VFD mode of operation of motor switching assembly 24). Bypass relay 38 is controlled to be in the On/closed position when input and output relays 34, 36 are in the Off/open position (with this being the bypass mode of operation of motor switching assembly 24).

As can be seen in FIG. 4, the solid-state contactor 32 is positioned upstream from a node 60 to which input relay 34 and bypass relay 38 are connected and at which input power is directed to either the bypass path 40 or the converter path 39 based on controlling of the input relay 34 and bypass relay 38. The positioning of solid-state contactor 32 at a location upstream from node 60 and from input and bypass relays 34, 38 allows for the solid-state contactor 32 to replace multiple discrete components in a typical bypass assembly configuration (i.e., separate/discrete input contactor, output contactor, bypass contactor, and SCR-based soft-starter components). Still further, positioning of solid-state contactor 32 at a location upstream from node 60 and from input and bypass relays 34, 38 allows for switching of the input and bypass relays 34, 38 at a zero load condition, as the SCRs 56 may be switched to an Off/non-conducting state for a period during which the relays are switched. Accordingly, the input and bypass relays 34, 38, may be in the form of lower rated relays having a voltage rating that is less than a full motor voltage of motor 22.

Figure 5:
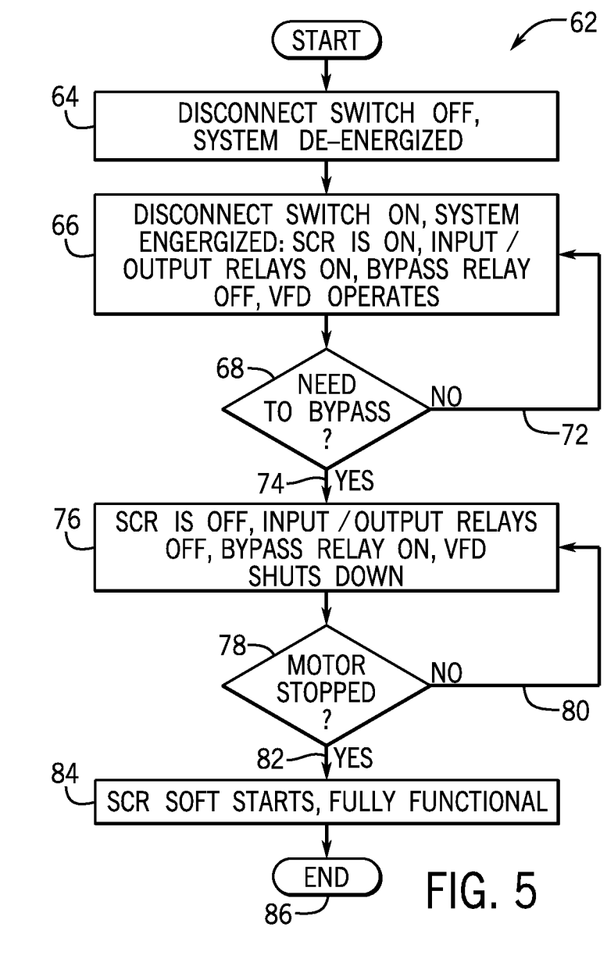
FIG. 5 is a flowchart illustrating a technique for transitioning a motor switching assembly from a power conversion mode of operation to a bypass mode of operation, according to an embodiment of the invention.
Figure 6:
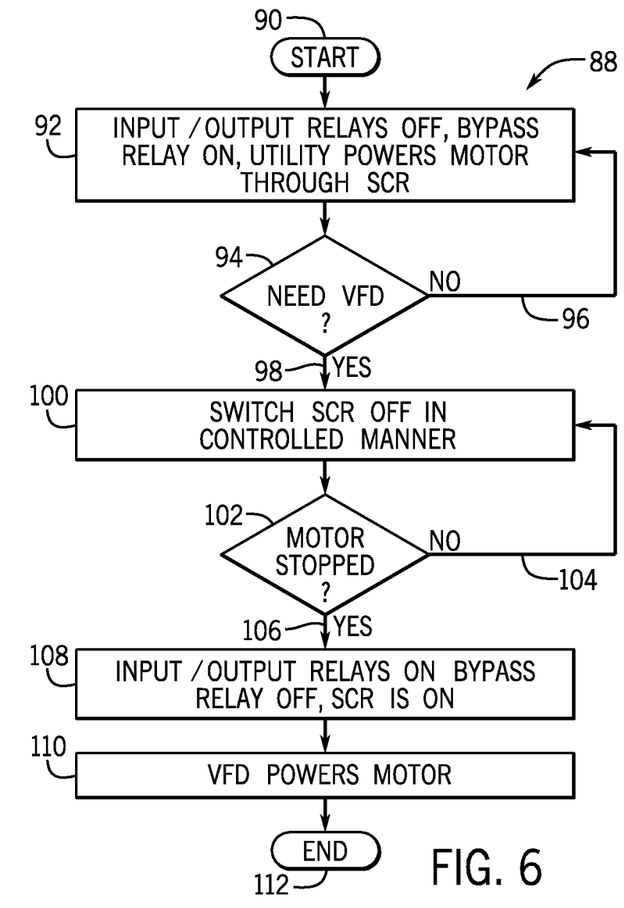
FIG. 6 is a flowchart illustrating a technique for transitioning a motor switching assembly from a bypass mode of operation to a power conversion mode of operation, according to an embodiment of the invention.

Referring now to FIGS. 5 and 6, and with continued reference back to FIGS. 1-3, methods for transitioning between the different operating modes of the motor switching assembly 24 are shown according to embodiments of the invention. FIG. 5 illustrates a method for transitioning from the VFD mode of operation to the bypass mode of operation. FIG. 6 illustrates a method for transitioning from the bypass mode of operation to the VFD mode of operation.

Referring first to FIG. 5, a method 62 for transitioning from the VFD mode of operation to the bypass mode of operation starts at STEP 64 where the power system 10 is in a de-energized state due to system disconnect being in an Off state. That is, power flow from an AC source 12 to the motor control system 18 is cut-off by system disconnect 14 due to its being in the Off state. At STEP 66, the system disconnect 14 is turned On, such that power flows to motor control system 18 (and motor switching assembly 24) and the system is energized. In this initial stage where the motor switching assembly 24 is in the VFD mode of operation, the solid-state contactor 32 is in an On state (i.e., conducting mode) at STEP 66—with the controller 26 causing SCRs 56 to be in a conducting state. As known in the art, the SCRs 56 may be brought into a conducting state either by increasing a voltage across the anode to cathode beyond breakover voltage or by applying a positive pulse at the gate of the SCRs 56. Also at STEP 66 and during the VFD mode of operation, the input relay 34 and output relay 36 are caused by controller 26 to be in the On/closed state, while bypass relay 38 is caused by controller 26 to be in the Off/open state.

At STEP 68, controller 26 determines whether to transition the motor switching assembly 24 to a bypass mode of operation. According to embodiments of the invention, the controller 26 may determine whether to transition to the bypass mode of operation (or stay in the VFD mode of operation) based on a number of inputs and/or criteria. In one embodiment, the controller 26 may determine whether to transition to the bypass mode of operation based upon detecting that the VFD unit 30 has experienced a fault condition or is otherwise not functioning properly, or that motor 22 is running at a constant/full speed whereby VFD operation is not needed. That is, controller 26 may compare one or more voltage and/or current values measured at the VFD unit 30 (as measured by voltage and/or current sensors or sensing circuits 70 (FIG. 2), for example), to one or more pre-defined thresholds in order to sense a short circuit or other fault condition in the VFD unit 30. For example, one or more voltage or current sampling or sensing circuits or sensors 70 may measure or determine voltage and/or current at one or more locations in the VFD unit 30, including current at the switch level of rectifier 42 or inverter 50, current on DC current 44, and/or output currents or voltages from the VFD unit 30. As one example, the controller 26 compares the DC link voltage to a pre-defined "Overvoltage Condition" to determine if the VFD unit 30 has malfunctioned. In another embodiment, the controller 26 may determine whether to transition to the bypass mode of operation based upon one or more inputs by an operator indicating that the motor 22 is to be operated in a steady-state condition, such as at full speed, that does not require power conditioning by the VFD unit 30, such that bypassing thereof might be beneficially employed (e.g., to reduce switching losses associated with VFD operation).

If controller 26 determines at STEP 68 that transitioning from the VFD mode to the bypass mode is not needed or desired, as indicated at 72, then the method loops back to STEP 66. In doing so, controller 26 continues operating the motor switching assembly 24 in the VFD mode—with SCRs 56 being operated in the On/conducting state and with input and output relays 34, 36 being On/closed and bypass relay 38 being Off/open. Conversely, if controller 26 determines at STEP 68 that transitioning from the VFD mode to the bypass mode is needed or desired, as indicated at 74, then the method continues to STEP 76 where such transitioning is performed. In operating to transition from the VFD mode to the bypass mode, the controller 26 first causes the SCRs 56 in solid-state contactor 32 to switch to the Off/non-conducting state, with both motor switching assembly 24 and solid-state contactor 32 thereof being operated in their transitional mode of operation. This switching of the SCRs 56 to the Off/non-conducting state may be performed by controller 26 in a known manner, such as by causing the gate to turn off and then shorting out the anode and cathode momentarily, such as with a push-button switch or transistor across the junction. Upon switching of the SCRs 56 to the Off/non-conducting state, controller 26 also causes input and output relays 34, 36 to move to the Off/open state and bypass relay 38 to move to the On/closed state. Beneficially, as the SCRs 56 are in the Off/non-conducting state during switching of the relays 34, 36, 38 between open and closed positions, the relays may be switched at a zero load condition, and thus lower rated relays (i.e., having a voltage rating that is less than motor voltage) may be implemented in conjunction with the use of solid-state contactor 32.

Upon switching the SCRs 56 to the Off/non-conducting state and switching the relays 34, 36, 38 to their desired state (i.e., input and output relays 34, 36 to the Off/open state and bypass relay 38 to the On/closed state), method then continues to STEP 78 with controller 26 determining whether the motor 22 has stopped. The determination of whether the motor 22 has stopped is for purposes of protecting the motor when transitioning from the VFD mode to the bypass mode, as the voltage and current provided to the motor in the bypass mode may differ greatly from the voltage and current provided to the motor via the VFD unit 30 in the VFD mode. Thus, if controller 26 determines at STEP 78 that the motor 22 has not stopped, as indicated at 80, then the method loops back to STEP 76. In doing so, controller 26 maintains operation of the motor switching assembly 24 in the transitional mode—with SCRs 56 being operated in the Off/non-conducting state and with input and output relays 34, 36 being Off/open and bypass relay 38 being On/closed.

Conversely, if controller 26 determines at STEP 78 that the motor 22 has stopped, as indicated at 82, then the method 62 continues to STEP 84 where controller 26 causes solid-state contactor 32 to be operated in the "soft-start" or "ramping" mode. That is, controller 26 selectively controls an On/Off switching of SCR pairs 56 to control transmission of voltage and current therethrough and thereby limit the transient voltages and current to the motor 22—allowing for a soft ramp-up of the motor. Upon completion of the ramp-up of the motor 22 performed at STEP 84, the method then ends at STEP 86, with it being understood that the motor switching assembly 24 is thereafter in a bypass mode of operation where SCRs 56 are operated in the On/conducting state and power is provided to motor 22 via bypass path 40 due to bypass relay 38 being kept On/closed and input and output relays 34, 36 being kept Off/open.

Referring now to FIG. 6, a method 88 for transitioning from the bypass mode of operation (back) to the VFD mode of operation is shown. In starting method 88 at STEP 90, the system disconnect 14 is assumed to be in an On position such that power is flowing to motor control system 18 and the system is energized. As shown at STEP 92, with the motor switching assembly 24 initially operating in the bypass mode, the solid-state contactor 32 is in an On/conducting state (i.e., conducting mode) while the input relay 34 and output relay 36 are in the Off/open state and the bypass relay 38 is in the On/closed state. Accordingly, the motor 22 is powered through the solid-state contactor 32 and the bypass path 40.

At STEP 94, a determination is made as to whether the motor switching assembly 24 needs to be transitioned to the VFD mode of operation. According to embodiments of the invention, the controller 26 may make a determination of whether to transition to the VFD mode of operation (or stay in the bypass mode of operation) based on a number of inputs and/or criteria. In one embodiment, the controller 26 may make the determination of whether to transition to the VFD mode of operation based upon one or more inputs by an operator indicating that variable speed/torque operation of the motor 22 is desired, such that conditioning/controlling of input power to the motor 22 by VFD unit 30 is required. In another embodiment, the controller 26 (or a user) may make the determination of whether to transition to the VFD mode of operation based upon a functioning VFD unit 30 replacing a VFD unit that had previously been identified as having experienced a fault condition or is otherwise not functioning properly, such that operation of the motor switching assembly 24 in VFD mode may be safely resumed.

If it is determined at STEP 94 that transitioning from the bypass mode to the VFD mode is not needed or desired, as indicated at 96, then the method loops back to STEP 92. In doing so, operation of the motor switching assembly 24 in the bypass mode is maintained—with controller 26 operating SCRs 56 in the On/conducting state and with input and output relays 34, 36 being Off/open and bypass relay 38 being On/closed. Conversely, if it is determined at STEP 94 that transitioning from the bypass mode to the VFD mode is needed or desired, as indicated at 98, then the method continues to STEP 100 where such transitioning is performed. In operating to transition from the bypass mode to the VFD mode (i.e., operate the motor switching assembly 24 and solid-state contactor 32 thereof in their transitional mode of operation), the controller 26 first causes the SCRs 56 in solid-state contactor 32 to switch to the Off/non-conducting state in a controlled manner.

Upon switching of the SCRs 56 to the Off/non-conducting state, method then continues to STEP 102 where controller 26 determines whether the motor 22 has stopped. The determination of whether the motor 22 has stopped is for purposes of protecting the motor when transitioning from the bypass mode to the VFD mode. If it is determined at STEP 102 that the motor 22 has not stopped, as indicated at 104, then the method loops back to STEP 100. In doing so, operation of the motor switching assembly 24 in the transitional mode is maintained—with controller 26 operating SCRs 56 in the Off/non-conducting state. Conversely, if it is determined at STEP 102 that the motor 22 has stopped, as indicated at 106, then the method continues to STEP 108 where controller 26 causes input and output relays 34, 36 to move to the On/closed state and bypass relay 38 to move to the Off/open state. Beneficially, as the SCRs 56 are in the Off/non-conducting state during switching of the relays 34, 36, 38 between open and closed positions, the relays 34, 36, 38 may be switched at a zero load condition, and thus lower rated relays (i.e., having a voltage rating that is less than motor voltage) may be implemented in motor switching assembly 24. Upon switching of the relays 34, 36, 38 to their desired state (i.e., input and output relays 34, 36 to the On/closed state and bypass relay 38 to the Off/open state), the controller 26 causes the SCRs 56 in solid-state contactor 32 to switch to the On/conducting state.

Upon switching of the input and output relays 34, 36 to the On/closed state and bypass relay 38 to the Off/open state and switching of the SCRs 56 to the On/conducting state, the method continues at STEP 110 by operating motor switching assembly 24 in the VFD mode. That is, three-phase power is provided to VFD unit 30, with the VFD unit 30 operating to output a controlled current and voltage to the motor 22 that provides for operation thereof at a desired speed. After the VFD mode of operation is entered at STEP 110, the method then ends at STEP 112 and the motor switching assembly 24 is thereafter in the VFD mode of operation where SCRs 56 are operated in the On/conducting state and power is provided to motor through VFD unit 30 due to bypass relay 38 being kept Off/open and input and output relays 34, 36 being kept On/closed.

Beneficially, embodiments of the invention thus provide a motor control system and method of operation thereof that enable more advanced controls in the motor control system, including power flow control and protection, while also reducing the number of discrete components that are necessary in the motor control system (i.e., removing discrete contactors and soft-starters of a bypass assembly). Integration of a multi-functional solid-state contactor and relays into a board level motor switching assembly provides electrical isolation and enables transitioning between operational modes, with the solid-state contactor and relays providing for routing power to a VFD or a bypass around the VFD and transitioning between states under a zero load condition. Integration of the multi-functional solid-state contactor and relays into a board level motor switching assembly reduces cable losses, results in fewer terminal connections, and eliminates voltage losses of those connections, such that a more efficient motor control system is provided.

According to one embodiment of the present invention, a motor control system for selectively controlling power from a power source to a load is provided. The motor control system includes a motor switching assembly comprising a power converter positioned on a converter path and configured to receive power from the power source and provide a controlled output power to the load, a first relay positioned on the converter path upstream of the power converter, a second relay positioned on a bypass path that is in parallel with the converter path, and a solid-state switching unit positioned upstream from the converter path and the bypass path, the solid-state switching unit comprising a plurality of solid-state switches. The motor control system also includes a control system that controls operation of the motor switching assembly. The control system is programmed to control switching of the plurality of solid-state switches to operate the solid-state switching unit in one of a conducting mode, a non-conducting mode, and a ramping mode, so as to selectively control and condition power flow therethrough. The control system is also programmed to control switching of the first and second relays between open and closed positions to selectively route power along the converter path or the bypass path.

According to another embodiment of the present invention, a controller-implemented method of operating a motor switching assembly for controlling power delivery from a power source to a load is provided. The method includes controlling the motor switching assembly to operate in one of a power conditioning mode or a bypass mode. In controlling the motor switching assembly to operate in the power conditioning mode, the method further includes operating a solid-state switching unit of the motor switching assembly in a conducting mode, operating an input relay of the motor switching assembly in a closed position, and operating a bypass relay of the motor switching assembly in an open position such that power from the power source is routed through the power converter, wherein the solid-state switching unit is positioned upstream from the power converter and upstream from a node to which the input relay and the bypass relay are parallelly connected. In controlling the motor switching assembly to operate in the bypass mode, the method further includes operating the solid-state switching unit in a conducting mode, operating the input relay in an open position, and operating the bypass relay in a closed position such that power from the power source bypasses the power converter.

According to yet another embodiment of the present invention, a board-level motor switching assembly for controlling power from a power source to a load is provided. The board-level motor switching assembly includes a PCB structure and a plurality of protection and control components integrated onto the PCB structure. The plurality of protection and control components includes a multi-functional solid-state contactor comprising a plurality of solid-state switches that are selectively switchable to control and condition power flow through the multi-functional solid-state contactor, a VFD unit downstream from the multi-functional solid-state contactor and operable to provide a controlled output power to the load, an input relay positioned between the multi-functional solid-state contactor and the VFD unit and being switchable to control power flow into the VFD unit, and a bypass relay positioned between the multi-functional solid-state contactor and the VFD unit and connected in parallel with the input relay, the bypass relay being switchable to control power flow onto a bypass path that routes power flow around the VFD unit.

The present invention has been described in terms of the preferred embodiment, and it is recognized that equivalents, alternatives, and modifications, aside from those expressly stated, are possible and within the scope of the appending claims.

What is claimed is:

1. A motor control system for selectively controlling power from a power source to a load, the motor control system comprising:
a motor switching assembly comprising:
a power converter positioned on a converter path and configured to receive power from the power source and provide a controlled output power to the load;
a first relay positioned on the converter path upstream of the power converter;
a second relay positioned on a bypass path that is in parallel with the converter path; and
a solid-state switching unit positioned upstream from the converter path and the bypass path, the solid-state switching unit comprising a plurality of solid-state switches; and
a control system that controls operation of the motor switching assembly, the control system programmed to:
control switching of the plurality of solid-state switches to operate the solid-state switching unit in one of a conducting mode, a non-conducting mode, and a ramping mode, so as to selectively control and condition power flow therethrough; and
control switching of the first and second relays between open and closed positions to selectively route power along the converter path or the bypass path.

2. The motor control system of claim 1 wherein the motor switching assembly comprises a board-level assembly where the power converter, converter path, bypass path, solid-state switching unit, and first and second relays are mounted to or formed on a printed circuit board (PCB).

3. The motor control system of claim 2 wherein the converter path and bypass path comprise conductive traces formed on an insulating substrate of the PCB.

4. The motor control system of claim 1 wherein the control system is programmed to selectively operate the motor switching assembly in a power conversion mode or a bypass mode, with power being routed to the power converter in the power conversion mode and to the bypass path in the bypass mode.

5. The motor control system of claim 4 wherein, in operating the motor switching assembly in the power conversion mode, the control system is programmed to:
operate the solid-state switching unit in the conducting mode, with the plurality of solid-state switches being in a conductive state; and
operate the first relay in the closed position and the second relay in the open position, such that power is routed to the power converter.

6. The motor control system of claim 4 wherein, in operating the motor switching assembly in the bypass mode, the control system is programmed to:
operate the solid-state switching unit in the conducting mode, with the plurality of solid-state switches being in a conductive state; and
operate the second relay in the closed position and the first relay in the open position, such that power is routed through the bypass path.

7. The motor control system of claim 4 wherein, in transitioning the motor switching assembly between the power conversion mode and the bypass mode, the control system is programmed to:
operate the solid-state switching unit in the non-conducting mode, with the plurality of solid-state switches being in a non-conductive state; and
selectively switch the first and second relays between the open and closed positions while the solid-state switching unit is operating in the non-conducting mode, such that the first and second relays are switched under a zero load condition.

8. The motor control system of claim 7 wherein, in transitioning the motor switching assembly from the power conversion mode to the bypass mode, the control system is programmed to operate the solid-state switching unit in the ramping mode, with the state of the plurality of solid-state switches being selectively switched to output a controlled power from the solid-state switching unit.

9. The motor control system of claim 1 further comprising a third relay positioned on the converter path downstream from the power converter, and wherein the control system is programmed to control switching of the third relay between open and closed positions and such that the third relay is in a same position as the first relay.

10. The motor control system of claim 1 wherein the first and second relays have at least one of a voltage rating that is less than a full voltage rating of the load and a current rating that does not require motor inrush current carrying capability.

11. The motor control system of claim 1 wherein the plurality of solid-state switches of the solid-state switching unit comprise one of silicon controlled rectifiers (SCRs) or thyristors.

12. The motor control system of claim 1 wherein the power converter comprises a variable frequency drive (VFD).

13. A controller-implemented method of operating a motor switching assembly for controlling power delivery from a power source to a load, the method comprising:
controlling the motor switching assembly to operate in one of a power conditioning mode or a bypass mode;
wherein controlling the motor switching assembly to operate in the power conditioning mode comprises:
operating a solid-state switching unit of the motor switching assembly in a conducting mode;
operating an input relay of the motor switching assembly in a closed position; and
operating a bypass relay of the motor switching assembly in an open position such that power from the power source is routed through the power converter;
wherein the solid-state switching unit is positioned upstream from the power converter and upstream from a node to which the input relay and the bypass relay are parallelly connected; and
wherein controlling the motor switching assembly to operate in the bypass mode comprises:
operating the solid-state switching unit in a conducting mode;
operating the input relay in an open position; and
operating the bypass relay in a closed position such that power from the power source bypasses the power converter.

14. The method of claim 13 further comprising:
operating the solid-state switching unit in a non-conducting mode when transitioning between the power conditioning mode and the bypass mode; and
switching the input and bypass relays between open and closed positions while operating the solid-state switching unit in the non-conducting mode.

15. The method of claim 14 further comprising switching the input and bypass relays between open and closed positions under a zero load condition while operating the solid-state switching unit in the non-conducting mode.

16. The method of claim 14 further comprising:
operating the solid-state switching unit in a ramping mode upon transitioning from the power conditioning mode to the bypass mode; and
selectively switching a plurality of solid-state switches of the solid-state switching unit to output a controlled power from the solid-state switching unit during the ramping mode.

17. The method of claim 13 further comprising:
operating an output relay located at an output of the power converter in a closed position when the motor switching assembly is operated in the power conditioning mode; and
operating the output relay in an open position when the motor switching assembly is operated in the bypass mode.

18. A board-level motor switching assembly for controlling power from a power source to a load, the board-level motor switching assembly comprising:
a printed circuit board (PCB) structure; and
a plurality of protection and control components integrated onto the PCB structure, the plurality of protection and control components comprising:
a multi-functional solid-state contactor comprising a plurality of solid-state switches that are selectively switchable to control and condition power flow through the multi-functional solid-state contactor;
a variable frequency drive (VFD) unit downstream from the multi-functional solid-state contactor and operable to provide a controlled output power to the load;
an input relay positioned between the multi-functional solid-state contactor and the VFD unit and being switchable to control power flow into the VFD unit; and
a bypass relay positioned between the multi-functional solid-state contactor and the VFD unit and connected to the input relay, the bypass relay being switchable to control power flow onto a bypass path that routes power flow around the VFD unit.

19. The board-level motor switching assembly of claim 18 wherein the plurality of protection and control components further comprises an output relay positioned at an output of the power converter, and whether the input relay and the output relay electrically isolate the VFD unit from the power source and the load, respectively, when in an open position.

20. The board-level motor switching assembly of claim 18 wherein the input relay and the bypass relay each have at least one of a voltage rating that is less than a full voltage rating of the load connected to the board-level switching assembly and a current rating less than a motor inrush current carrying capability.

* * * * *